E. W. KNOBELSDORF.
CENTERING DEVICE FOR LATHES.
APPLICATION FILED JULY 16, 1906.
930,077.
Patented Aug. 3, 1909.
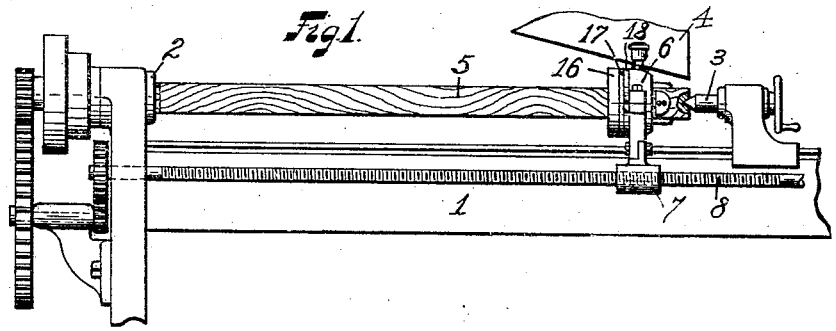
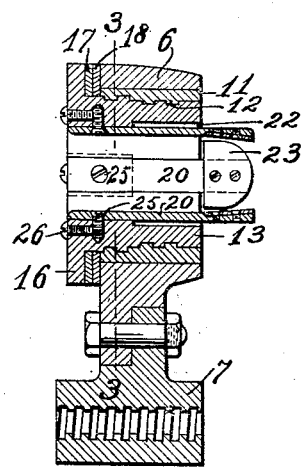
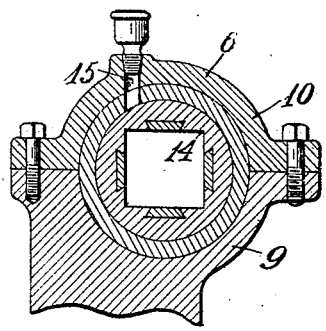
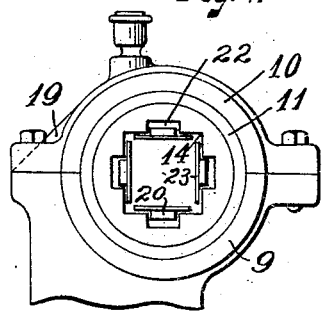
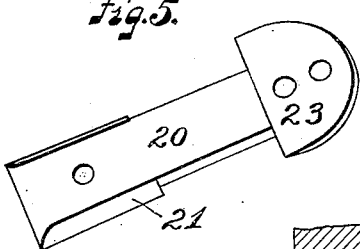
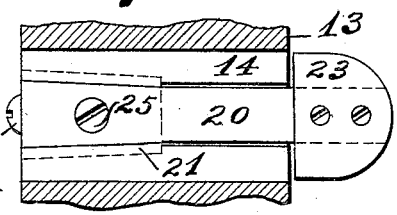
Witnesses:
Inventor,
Edwin W. Knobelsdorf,
By Bates, Fouts & Hull
Attorneys.

UNITED STATES PATENT OFFICE.

EDWIN W. KNOBELSDORF, OF CLEVELAND, OHIO.

CENTERING DEVICE FOR LATHES.

No. 930,077.　　　Specification of Letters Patent.　　　Patented Aug. 3, 1909.

Application filed July 16, 1906. Serial No. 326,361.

*To all whom it may concern:*

Be it known that I, EDWIN W. KNOBELSDORF, a citizen of the United States, residing at Cleveland, in the county of Cuyahoga and State of Ohio, have invented a certain new and useful Improvement in Centering Devices for Lathes, of which the following is a full, clear, and exact description, reference being had to the accompanying drawings.
The object of this invention is to provide a very efficient and accurate self-centering spring die for lathes. The die is especially designed for use with automatic back-knife wood turning lathes, and is arranged to travel along the piece being turned, supporting and centering it, as the knife cuts it.

The particular features comprising the invention are hereinafter more fully described and definitely set out in the claims.
In the drawings, Figure 1 is a front elevation of a portion of a back-knife lathe having my improved self-centering die; Fig. 2 is a longitudinal section through the die itself, the section being off-set so as to pass through the nut on the feed screw; Fig. 3 is a cross section of the die on the vertical line 3—3 of Fig. 2; Fig. 4 is an end view of the die looking from the right hand end in Figs. 1 and 2; Fig. 5 is a perspective view of the spring, and Fig. 6 is a cross section through the bore of the die parallel with one of the springs.

Referring to the parts by reference numerals, 1 represents a suitable wood turning lathe having the usual rotatable head block 2, tail spindle 3, and back-knife 4.

5 represents the stick of wood to be turned, which is shown in Fig. 1 as held between the head block and tail spindle and passing through the spring die 6 which comprises my invention. This spring die is mounted in a frame piece which is secured to a traveling carriage 7 driven by a screw 8. The purpose of the die is to accurately center and support the stick being turned, as it is cut by the knife.

The frame 6 of my die comprises two portions, namely; the lower portion 9 which is bolted to the carriage 7 and has a semi-cylindrical recess in its upper face, and the upper or cap portion 10, which has a corresponding recess and is bolted to the base portion. Within the cylindrical recess provided in the frame is a lining of Babbitt metal 11, which is suitably held to the two portions of the frame and is formed with inwardly projecting annular ribs 12. Rotatably mounted within the babbitt is a sleeve or chuck-head 13, with a square opening or bore 14, through which the stick 5 passes. This sleeve has on its outer surface peripheral grooves in which the babbitt seats. The babbitt may be simply cast within the frame about the sleeve 13, the babbitt being prevented from adhering to the sleeve, whereby the sleeve may rotate in the babbitt, but is prevented from moving longitudinally independently of the frame. A suitable oil opening 15 is provided to the rubbing surfaces of the babbitt and sleeve.

To reduce the friction of end thrust, I form the sleeve with a flange 16 overlapping the frame, and between this flange and frame are a pair of washers 17 and 18. If the sleeve is made of brass, the washer 18 is likewise of brass while the washer 17 is of some dissimilar metal, as steel. The washer 18 is prevented from rotating by a lug 19 engaging a projection on the frame. The rubbing thus takes place between surfaces of brass and steel, which, as is well understood, reduces the friction.

The rotating sleeve 13, besides having the square opening 14, referred to, is provided with four centering springs, now to be described. These centering springs are indicated by 20. They are dove-tailed into the sleeve by having outwardly flaring edges 21 near one end, which edges fit corresponding under-cut walls in recesses formed in the sleeve. In advance of these undercut walls, the sleeve is cut away to leave a clear space 22 at the back of the spring 20. At its free end, beyond the sleeve, each spring carries a bearing plate 23. These four bearing plates are preferably of such width that their edges nearly touch. The corners of the square opening 14 form an absolute guide for the wooden stick, which is only slightly smaller than this opening. The springs are made quite stiff and thus effectively and accurately center the stick and hold it against loose movement, though it be somewhat smaller than the opening 14. To securely hold the springs to the sleeve, they are not only dove-tailed therein, as described, but the dove-tail edges 21 flare outwardly toward the secured end of the spring, as shown in Fig. 6. These springs are driven snugly into place in these under-cut and tapered recesses in the sleeve. They are then further secured by screws 25 which pass through the springs into the sleeve, and these screws are then locked by set screws 26, screwing into the sleeve against the screws 25. By this means, a very effective securement is provided.

With the old style of centering dies, great care has to be exercised in forming or selecting the stock before it is introduced into the die, for if the stock be too small in cross-section it will wabble and chatter, making it impossible to produce a regular design and frequently resulting in injury to the cutting knife. Therefore in order to avoid this danger, the stock introduced into the supporting and centering device has been made to fit so close that if there be the slightest enlargement at the opposite end to the end first introduced, it will result in splitting the centering device.

When using my improved device much less care has to be used in selecting the stock, as my device will accommodate a considerable variation in the size of the stock, and also a great saving can be accomplished, as irregular sizes of stock can be worked up, which would otherwise have to be discarded.

The square bore of my spring carrying sleeve has two decided advantages over a cylindrical bore; first, it enables the sleeve to be made small enough in diameter so that there may be employed the usual back knife with its cutting edge at the proper angle. Any unnecessary increase in size in this diameter requires either that the edge of the back knife be at a more abrupt angle to the stock, which interferes with clean cutting, or the knife is prevented from acting on the stock immediately adjacent to the end of the springs. Second, the square bore makes the device self centering. The stock is put in the device before it is held between the lathe centers. Thus, with the centering device near one of these centers, the stock is given a slight twist to cause its four corners to engage the four sides of the bore near the corners. This absolutely centers the stock and allows the lathe head to properly engage the stock, the die being then shifted to the other end of the bed, the other center is similarly located. This is impossible with a round bore, and gives to my die its self centering character.

Having thus described my invention, I claim:

1. The combination of a rotatable sleeve, springs within the bore of the sleeve having beveled edges, and undercut grooves in the sleeve which said springs occupy, whereby the springs are dove-tailed to the sleeve the sleeve being recessed behind the springs to permit play thereof.

2. The combination of a sleeve having a bore composed of a number of flat sides, each side being grooved, said grooves tapering, and springs—one for each side—having a tapered portion adapted to occupy a corresponding groove the flat sides being recessed behind the springs to permit play thereof.

3. The combination of a sleeve having a bore composed of a number of flat sides, each side being grooved centrally and longitudinally, said grooves tapering, and springs—one for each side—having a tapered portion adapted to occupy a corresponding groove, the flat sides being recessed behind the springs to permit play thereof and a screw for each spring adapted to lock it in its seat.

4. The combination with a sleeve, springs occupying the bore of the sleeve and seating in grooves formed in the sleeve the sleeve being recessed behind the springs to permit play thereof, screws for locking said springs in said side, and set screws for locking said screws.

5. The combination of a rotatable sleeve having a bore consisting of a number of flat sides, each side being formed with a central longitudinal groove, said groove being undercut, and flat springs occupying said bore, one for each flat side, each side being recessed behind this spring to permit play thereof, and a beveled portion which tightly seats in the undercut portion of the groove.

6. The combination of a rotatable sleeve having a bore consisting of a number of flat sides, each side being formed with a longitudinal groove, said groove having a portion under-cut and tapered, and springs occupying said bore, one for each flat side, each side being recessed behind this spring to permit play thereof and a beveled portion which tightly seats in the undercut portion of the groove, and means for locking the beveled portion of the spring in its seat.

7. In a self centering die, the combination of a rotatable sleeve having a square bore, each face of the bore being provided with a longitudinal groove, a spring occupying said groove and secured near one end to the sleeve, and extending at the other end beyond the sleeve, and having a flaring head beyond the sleeve, the edges of the four heads approximating each other.

8. The combination, with a rotatable sleeve having a square bore, of four flat spring members within such bore secured to the sleeve and each extending along the side of the bore and having a head beyond the sleeve, the edges of the four heads approximating each other, and recesses behind said members allowing them to be spread to bound an opening substantially the size of said bore.

9. The combination of a sleeve having a polygonal bore, springs within the bore having beveled edges and under-cut grooves in the sleeve in which said springs are placed, screws for holding said springs in place, and means to prevent rotation of said screws.

In testimony whereof, I hereunto affix my signature in the presence of two witnesses.

EDWIN W. KNOBELSDORF.

Witnesses:
ALBERT H. BATES,
S. E. FOUTS.